(12) United States Patent
Nasir et al.

(10) Patent No.: US 8,667,303 B2
(45) Date of Patent: *Mar. 4, 2014

(54) PERIPHERAL AUTHENTICATION

(75) Inventors: Irfan Nasir, Lake in the Hills, IL (US); Francis P Bourque, Mundelein, IL (US); Sanjay Gupta, Lakewood, IL (US); Robert M Johnson, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 533 days.

This patent is subject to a terminal disclaimer.

(21) Appl. No.: 12/951,467

(22) Filed: Nov. 22, 2010

(65) Prior Publication Data

US 2012/0131353 A1    May 24, 2012

(51) Int. Cl.
*G06F 11/30* (2006.01)
*G06F 12/14* (2006.01)

(52) U.S. Cl.
USPC ................ 713/189; 710/2; 710/5; 710/8

(58) Field of Classification Search
None
See application file for complete search history.

(56) References Cited

U.S. PATENT DOCUMENTS

| | | | |
|---|---|---|---|
| 5,028,859 A | 7/1991 | Johnson et al. | |
| 6,381,477 B1 | 4/2002 | Johnson, Jr. et al. | |
| 7,028,105 B2 | 4/2006 | Dute et al. | |
| 7,242,923 B2 | 7/2007 | Perera et al. | |
| 7,451,064 B2 | 11/2008 | Hodge et al. | |
| 7,498,766 B2 | 3/2009 | Paul et al. | |
| 7,571,263 B2 | 8/2009 | Campello et al. | |
| 7,598,700 B2 | 10/2009 | Elder et al. | |
| 7,656,867 B2 | 2/2010 | Herbert | |
| 7,734,933 B1 | 6/2010 | Marek et al. | |
| 7,752,675 B2 | 7/2010 | Lee | |
| 8,225,385 B2 | 7/2012 | Chow et al. | |
| 2003/0197512 A1 | 10/2003 | Miller et al. | |
| 2004/0124996 A1* | 7/2004 | Andersen | 340/870.38 |
| 2005/0182860 A1 | 8/2005 | Schneckenburger | |
| 2005/0251589 A1 | 11/2005 | Wang | |
| 2006/0190653 A1 | 8/2006 | Wahler et al. | |
| 2006/0277339 A1 | 12/2006 | Sakaki et al. | |
| 2007/0081506 A1 | 4/2007 | Yamada | |
| 2007/0214296 A1 | 9/2007 | Takamatsu et al. | |
| 2008/0091762 A1 | 4/2008 | Neuhauser et al. | |
| 2008/0186403 A1 | 8/2008 | Douillet | |

(Continued)

FOREIGN PATENT DOCUMENTS

CN    201438370 U    4/2010
EP    1422625 A1    5/2004

(Continued)

OTHER PUBLICATIONS

Jinrong Qian, "Battery Authentication Improves Battery Security", EE Times-India/eetindia.com, Sep. 10, 2008, 4 pages.

(Continued)

*Primary Examiner* — Scott Sun
(74) *Attorney, Agent, or Firm* — Wolfe—SBMC; Sylvia Chen (57) ABSTRACT

This document describes techniques (300, 400) and apparatuses (100, 500, 600, 700) for peripheral authentication. These techniques (300, 400) and apparatuses (100, 500, 600, 700) may configure data lines for authentication between host device (102) and peripheral (106), use these configured data lines to authenticate the peripheral (106), and then reconfigure the data lines for use.

20 Claims, 7 Drawing Sheets

(56) References Cited

U.S. PATENT DOCUMENTS

| | | |
|---|---|---|
| 2009/0049307 A1 | 2/2009 | Lin |
| 2009/0061678 A1 | 3/2009 | Minoo et al. |
| 2009/0083834 A1 | 3/2009 | Rubinstein et al. |
| 2009/0307734 A1 | 12/2009 | Doi et al. |
| 2010/0022277 A1 | 1/2010 | An et al. |
| 2010/0075604 A1 | 3/2010 | Lydon et al. |
| 2010/0146134 A1 | 6/2010 | Kobayashi et al. |
| 2010/0161860 A1 | 6/2010 | Chien et al. |
| 2010/0295384 A1 | 11/2010 | Kobayashi |
| 2010/0325298 A1* | 12/2010 | Nelson .......................... 709/229 |
| 2011/0055407 A1* | 3/2011 | Lydon et al. ................... 709/228 |
| 2012/0021808 A1 | 1/2012 | Tseng |
| 2012/0030393 A1 | 2/2012 | Ganesh et al. |
| 2012/0071134 A1 | 3/2012 | Jensen |
| 2013/0080662 A1 | 3/2013 | Bourque |

FOREIGN PATENT DOCUMENTS

| | | |
|---|---|---|
| JP | 2010092202 A | 4/2010 |
| WO | 1997037305 A1 | 10/1997 |
| WO | 2012071133 A4 | 5/2012 |

OTHER PUBLICATIONS

United States Patne and Trademark Office, "Non-Final Rejection" U.S. Appl. No. 12/982,981, Mar. 30, 2012, 18 pages.

Roger Ady et al., "Authenticating, Tracking, and Using a Peripheral", U.S. Appl. No. 12/982,981, filed Dec. 31, 2010, 41 pages.

Patent Cooperation Treaty, "PCT Search Report and Written Opinion of the International Searching Authority" for International Application No. PCT/US2011/058510, May 11, 2012, 18 pages.

Hewlett-Packard Company et al., "Universal Serial Bus 3.0 Specification" Revision 1.0, USB Implementers Forum, Nov. 12, 2008, pp. 5-33 and 5-34.

United States Patent and Trademark Office, "Notice of Allowance and Fee(s) Due" for U.S. Appl. No. 12/982,981, Dec. 12, 2012, 12 pages.

Digital TV Design Line, "The Nuts and Bolts of HDCP", Feb. 20, 2008, 5 pages.

Patent Cooperation Treaty, "PCT Search Report and Written Opinion of the International Searching Authority" for International Application No. PCT/US2012/055321, Apr. 9, 2013, 18 pages.

* cited by examiner

PERIPHERAL AUTHENTICATION

BACKGROUND

Users usually accessorize their computing devices. A desktop computer can be accessorized with various peripherals, such as an external hard drive or speakers. A tablet computer can be accessorized with a mouse or external battery. A smartphone can be accessorized with a docking station, an external keyboard, or a charger. These are just a few of many ways in which users accessorize computing devices with peripherals.

These peripherals, however, may damage or fail to make full use of the host computing device. Some peripherals are not properly designed, such as batteries that overheat or chargers that overload their host computing device. Still other peripherals fail to make full use of, or properly interact with, the host computing device, such as its user interface or services.

BRIEF DESCRIPTION OF THE DRAWINGS

Techniques and apparatuses for peripheral authentication are described with reference to the following drawings. The same numbers are used throughout the drawings to reference like features and components.

DETAILED DESCRIPTION

Host computing devices often fail to authenticate a peripheral before use of that peripheral. Failing to authenticate may result in damage to, or less than full use of, the host computing device or peripheral. This disclosure describes techniques and apparatuses for peripheral authentication that can protect host computing devices from potentially damaging peripherals or permit them to be more-fully used.

The following discussion first describes an operating environment, followed by techniques that may be employed in this environment, and ending with example apparatuses.

Operating Environment

Figure 1:
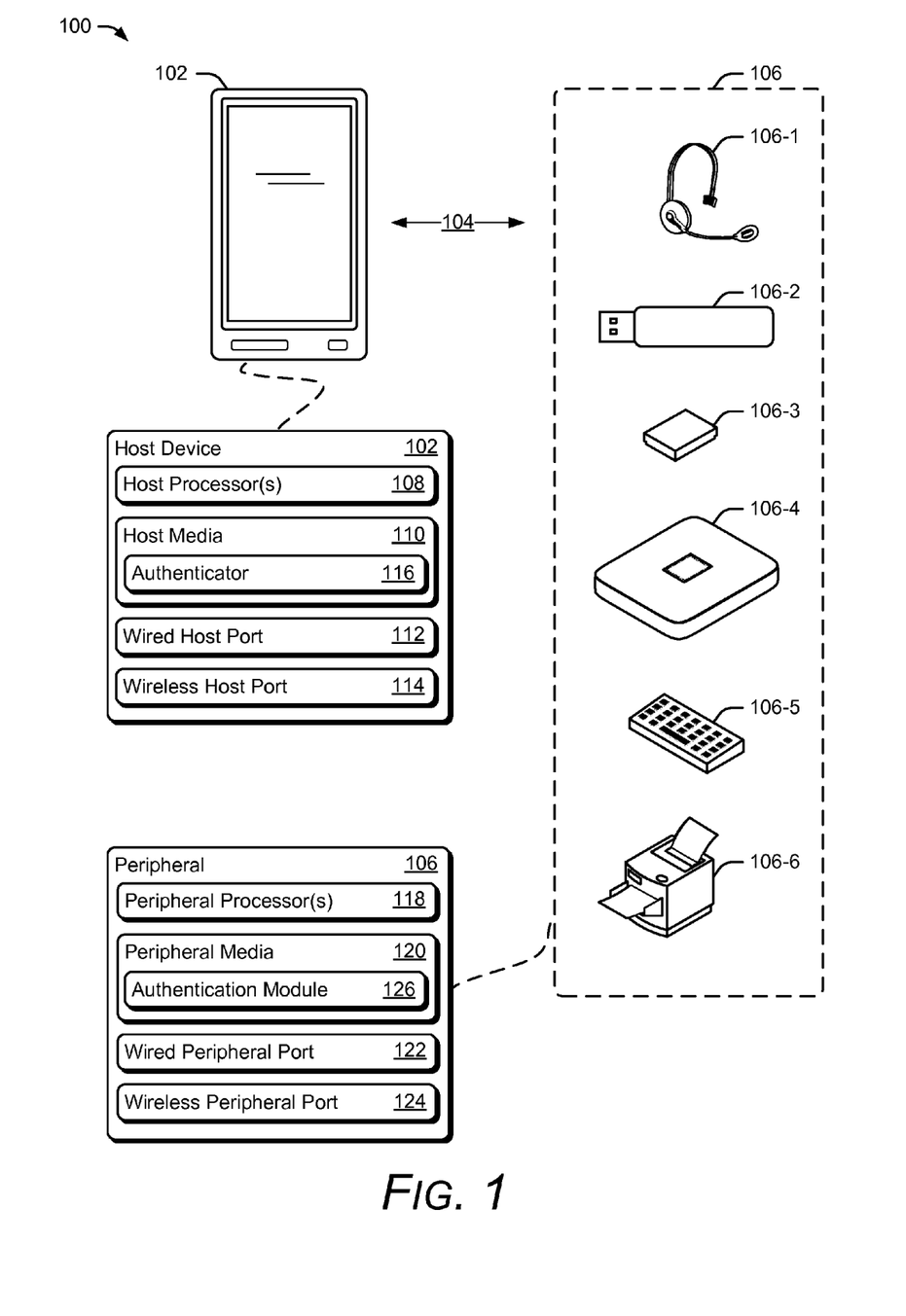
FIG. 1 illustrates an example environment in which techniques for peripheral authentication can be implemented.

FIG. 1 illustrates an example environment 100 in which techniques for peripheral authentication can be implemented. The example environment 100 includes a host device 102, a communication medium 104, and a peripheral 106. The host device 102 can be, or include, many different types of computing devices, such as a smartphone, a cellular phone having limited computational abilities, a laptop, a tablet computer, or a desktop computer.

Host device 102 includes host processor(s) 108, host computer-readable media 110 (host media 110), a wired host port 112, and/or a wireless host port 114. Host media 110 includes authenticator 116, which authenticates peripheral 106, alone or in conjunction with other elements of host device 102 or peripheral 106.

Peripheral 106 can be one of many different types of devices capable of communication with, and providing a service to, host device 102. Six example peripherals are shown, though others are contemplated. These example peripherals include a wireless headset 106-1, a smart flash drive 106-2 having a five-pin universal serial bus (USB) connector, a battery charger 106-3, a docking station 106-4, a keyboard 106-5, and a multi-function printer 106-6.

Peripheral 106 includes peripheral processor(s) 118, peripheral computer-readable media 120 (peripheral media 120), wired peripheral port 122, and/or wireless peripheral port 124. Peripheral media 120 includes an authentication module 126. Authentication module 126 is configured to determine a cryptographic response to a challenge received from host device 102, the cryptographic response indicating that the peripheral device is authentic.

Communication medium 104 provides a wired or wireless medium by which host device 102 and peripheral 106 may communicate. Examples include a wired medium from wired peripheral port 122 to wired host port 112 or a wireless medium of a wireless connection communicating via wireless peripheral port 124 and wireless host port 114. Example wireless networks include personal-area networks (PAN), local-area networks (LAN), and wide-area networks (WAN).

Figure 2:
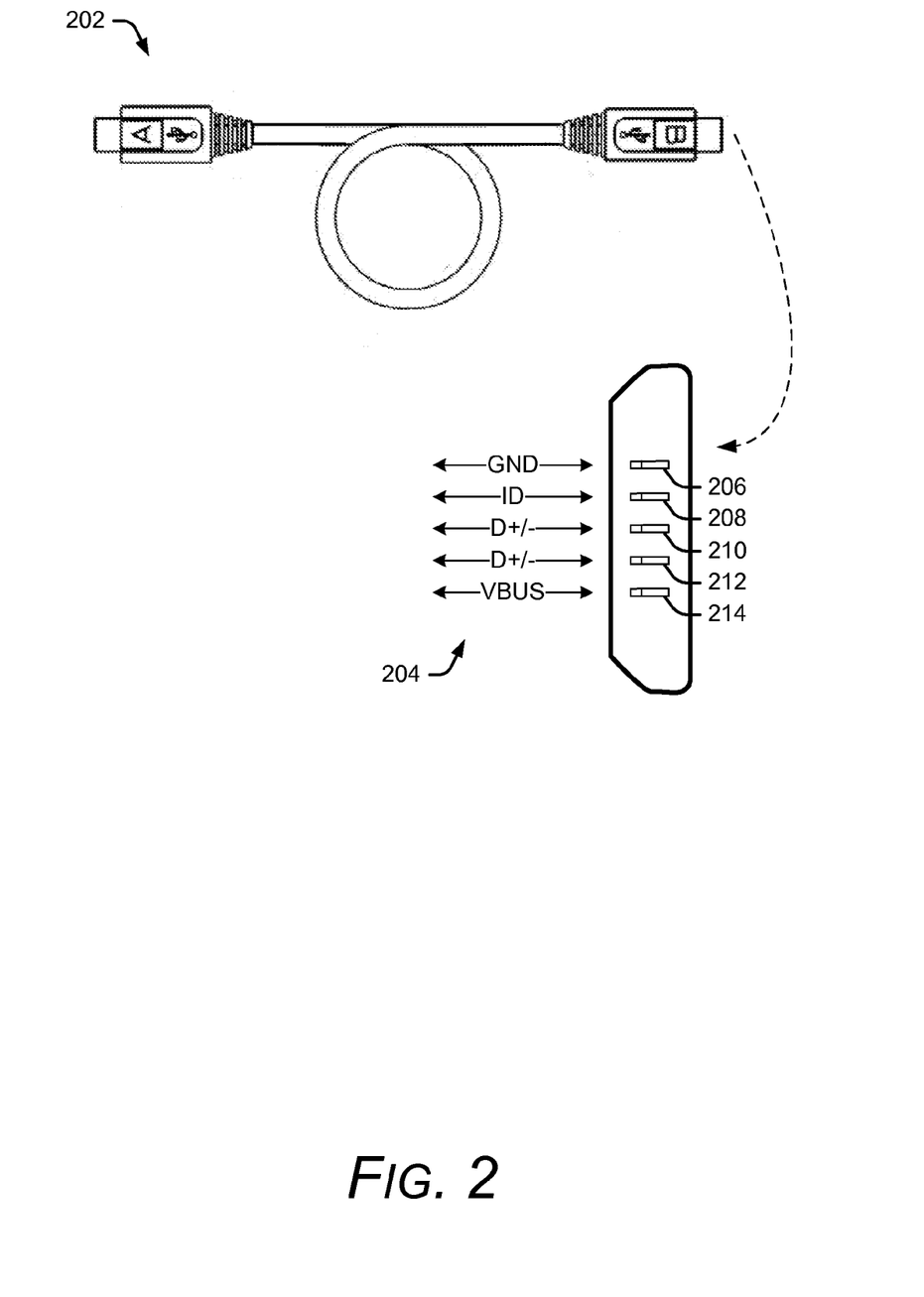
FIG. 2 illustrates an example of a communication medium illustrated in FIG. 1, the example being a micro universal serial bus (USB) cord.

FIG. 2 illustrates an example of communication medium 104, the example being a micro universal serial bus (USB) cord 202. The example micro USB cord 202 has a USB connector that includes five lines 204: a ground line (GND) 206; an identification line (ID) 208; a first data line (D+/−) 210; a second data line (D+/−) 212; and a power line (VBUS) 214. Ways in which micro USB cord 202 can be used are set forth below.

Example Techniques

The following discussion describes techniques for peripheral authentication, which in many cases enable greater safety or better use of host devices or peripherals. These techniques can be implemented utilizing the previously described environment, such as authenticator 116 and authentication module 126 of FIG. 1. These techniques include example methods illustrated in FIGS. 3 and 4, which are shown as operations performed by one or more entities. The orders in which these method blocks are described are not intended to be construed as a limitation, and any number or combination of the described method blocks can be combined in any order to implement a method, or an alternate method, including those drawing from both FIGS. 3 and 4.

Figure 3:
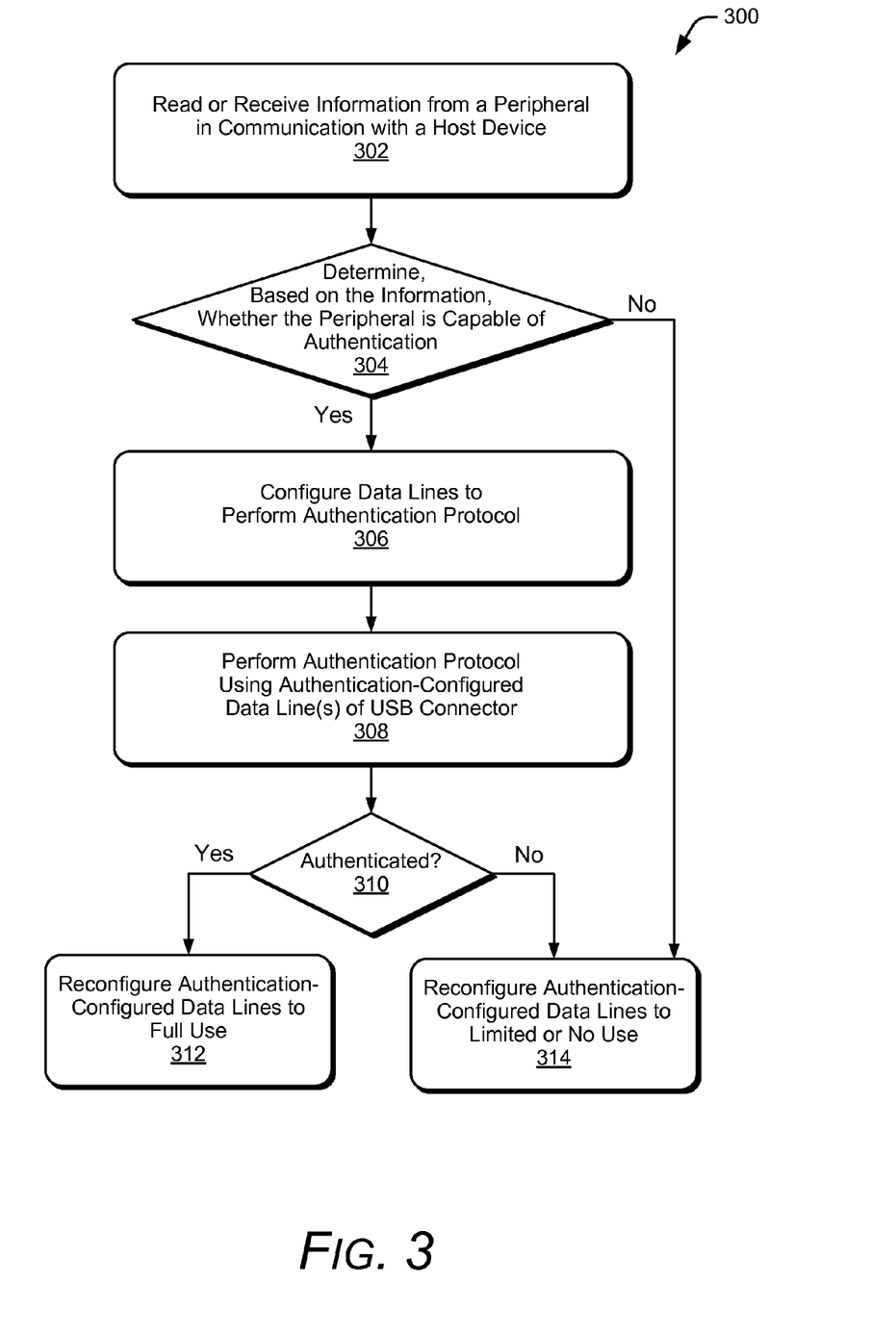
FIG. 3 illustrates example method(s) for peripheral authentication performed at least in part by a host device.

FIG. 3 illustrates example method(s) 300 for peripheral authentication performed at least in part by a host device.

At block 302, a host device reads or receives information from a peripheral. This information can indicate a type of the peripheral, such as a charger type or docking-station type, or an identifier for the peripheral. This information can be responsive to a physical or wireless connection, such as micro USB cord 202 or a wireless communication.

Consider three example manners in which this information is read or received. In a first example, wireless headset 106-1 transmits a signal from wireless peripheral port 124 following a wireless personal-area-network (WPAN) protocol, which is received by host device 102 through wireless host port 114. In a second example, host device 102 receives information from charger 106-3 transmitted via wired peripheral port 122 through data lines 210 and/or 212 of micro USB cord 202, which host device 102 receives at wired host port 112. In this second example, information is received over data line(s) 210 and/or 212 according to a USB protocol, which permits transmission of data over D+ and D− lines 210 and 212 using half-duplex differential signaling. In half-duplex differential signaling, both data lines 210 and 212 transmit at the same time or receive at the same time.

In a third example, host device 102 reads a resistance on ID line 208 of micro USB cord 202 connected to peripheral port 122 using wired host port 112. In this third example, authenticator 116 of host device 102 actively engages with peripheral 106 by determining that ID line 208, and thus circuitry of peripheral 106, has a resistance consistent with a particular type of peripheral.

Other information may also be read or received, including though data line(s) 210 and/or 212, detailed examples of which are set forth below.

At block 304, the host makes a determination, based on the information from the peripheral, as to whether the peripheral is capable of authentication. If capable of authentication, methods(s) 300 proceed along a "Yes" path to block 306. If not capable of authentication, method(s) 300 proceed along a "No" path to block 314.

Host device 102 may make this determination based on the type of peripheral or an identifier or just information indicating that peripheral 106 is potentially authentic, which may be a resistance found for ID line 208 (e.g., 200 k ohms). Host device 102 may determine the resistance on ID line 208 using authenticator 116 and/or a resistor divider, analog-to-digital converter, and/or a windowed comparator, to name a few.

Host device 102, through authenticator 116, can compare the identifier with a database of identifiers known to be authentic. A peripheral can be authenticated, or determined to be potentially authentic, when the peripheral is a device (or class of devices) previously known to be of a particular nature, generally a nature that has not been found to be potentially damaging or that has been designed to function with host device 102. In some embodiments, an authentic peripheral is one that includes an authentication module capable of successfully responding to a cryptographic challenge, such as authentication module 126.

At block 306, the host configures the data lines to perform an authentication protocol. Authenticator 116 can configure one or both data lines of host device 102 (which connect to data lines 210 and 212 of FIG. 2) and peripheral 106, for example, and use these data lines to perform the authentication protocol. Authenticator 116 can configure these data lines of peripheral 106, for example, by causing a hardware switch to activate in peripheral 106 through a voltage level placed on (or biasing) ID line 208.

In some cases, authenticator 116 configures data lines for asynchronous receiving and transmitting (e.g., following a universal asynchronous receiver/transmitter (UART) protocol), such as cases in which authentication module 126 is known or presumed to be configured for UART signaling. In more detail, UART protocols use non-differential signaling, such as one line for transmitting and another line for receiving data, and can implement either full-duplex or half-duplex data transfer depending on implementation. This differs from USB protocols, which use differential signaling, such as using both data lines to transmit or using both data lines to receive (at different times) and can only support half-duplex data transfer. This use of two lines for the UART protocol is optional, shown at dashed line 510 in FIG. 5. Depending on implementation, the UART protocol may use only a single line to perform half-duplex data transfer (e.g., use a one-wire authentication protocol).

Figure 5:
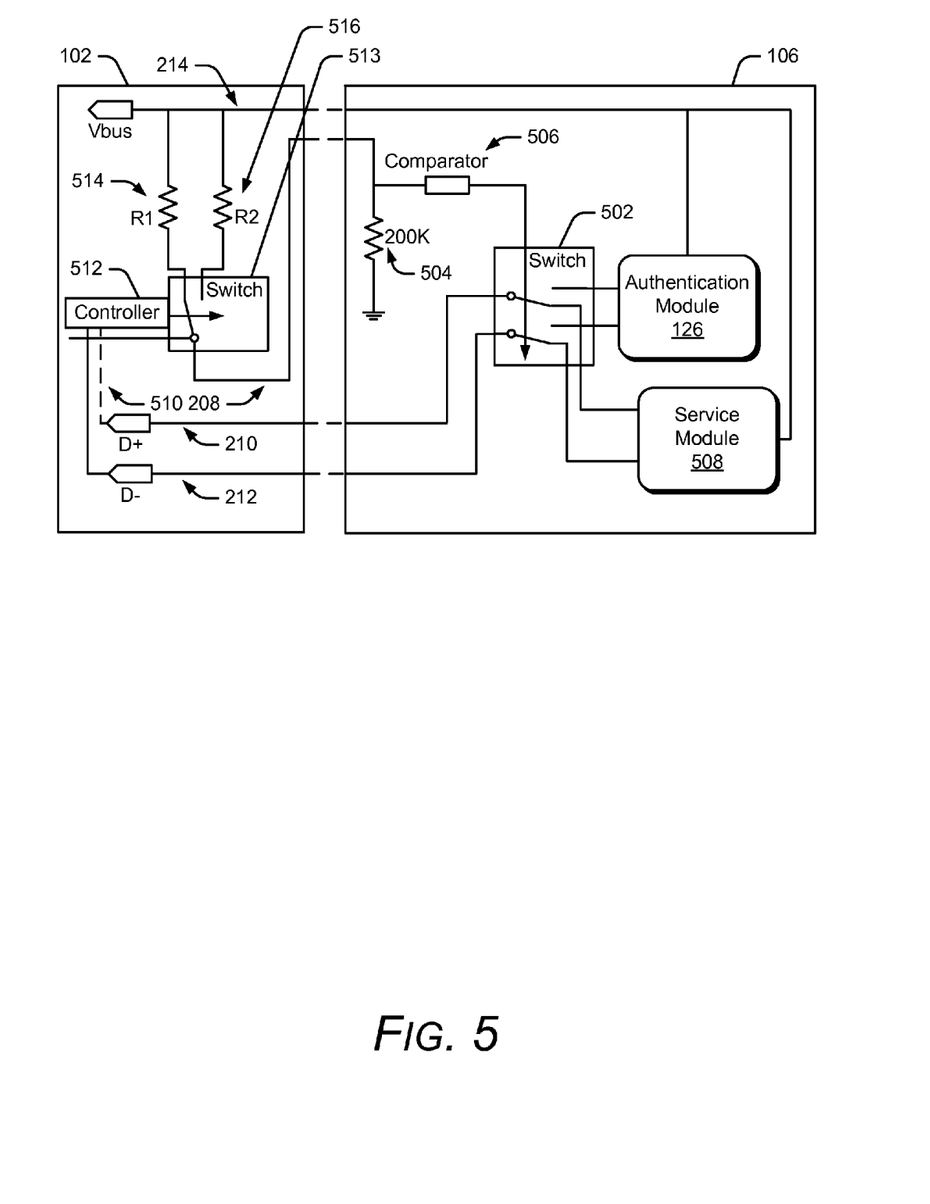
FIG. 5 illustrates examples of entities of FIG. 1 in communication through a universal serial bus cord.

As shown in FIG. 5, authenticator 116 can use a controller, here controller 512, capable of directing switch 513 from a first position (e.g., a position that enables a USB signaling configuration) with a first resistance R1 shown at 514 to a second resistance R2 shown at 516. This switch to resistance R2 creates a different voltage on ID line 208, which is sensed by comparator 506, which then causes switch 502 to configure data lines 210 and/or 212 to authentication module 126 (which uses UART signaling in this example) from service module 508 (which uses USB signaling in this example).

Ways in which authenticator 116 configures data lines are set forth in greater detail below.

For wireless communications, authenticator 116 communicates with peripheral 106 effective to configure data and control lines at host device 102 and peripheral 106 for wireless communications (e.g., with wireless headset 106-1) and following a network protocol (e.g., established by peripheral 106 with a radio-frequency communication (RFCOMM) serial port connection).

Note that these data lines are often previously configured, prior to block 306, for services rather than authentication, such as audio or video, reading and writing data, and power control, which can be performed in some embodiments by one peripheral (e.g., a music-playing device having memory and power). As noted previously, in some embodiments this previous configuration uses a different signaling scheme (e.g., USB signaling) than the authentication configuration (e.g., UART signaling).

At block 308, the authentication protocol is performed using the authentication-configured data lines to determine if the peripheral is authentic. Various manners of authentication can be used. In this ongoing example, the information received at block 302 includes an identifier, responsive to which authenticator 116 determines whether the identifier matches one of a set of authentic identifiers and, responsive to a match, challenges peripheral 106 through the authentication-configured data lines. This set of authentic identifiers is accessible by host device 102, such as by being stored in host media 110. If the information does not include an identifier, authenticator 116 can request an identifier from the peripheral either through the authentication-configured data lines or otherwise and proceed with a challenge-and-response form of authentication. Note that the identifier received at block 302 and the authentic identifiers of the set can be unique and/or cryptographically secure, though this is not required.

In one embodiment, authenticator 116 challenges peripheral 106 by sending a random number over the authentication-configured data lines. In response, peripheral 106 computes a response with a secret key and returns that response. Alternately, the peripheral 106 could use a look-up table to select a response to the challenge. Authenticator 116 receives that response, compares it with an expected response, and if they match, determines that peripheral 106 is authentic. To do so, authenticator 116 and/or peripheral 106 (e.g., using authentication module 126) may perform one or more cryptographic algorithms.

A "Yes" path proceeds from block 310 to block 312 responsive to the peripheral providing the expected response, or a "No" path proceeds from block 310 to block 314 responsive to the peripheral not being authenticated due to an unexpected response to the challenge.

At block 312, the host reconfigures the authentication-configured data lines to full use. This reconfiguration of authentication-configured data lines depends on various factors, such as whether or not host device 102 or peripheral 106 has control over functions and services of peripheral 106 and/or host device 102. At the least, however, authenticator 116 disconnects these data lines from the authentication module and establishes these data lines to a service module (e.g., controllers or service providers) of peripheral 106. Authenticator 116 may switch these data lines from authentication to service through ID line 208 or one of data lines 210 or 212, such as by delivering a voltage to one of lines 208, 210, or 212.

Continuing the example referenced above for FIG. 5, after confirming that peripheral 106 is authenticated, controller 512 switches from the second position where ID line 208 has resistance R2 shown at 516 back to the first position with ID line 208 having resistance R1 shown at 514. Thus, controller 512 switches from an authentication configuration of data lines 210 and 212 (here to authentication module 126 which uses UART signaling) to a service configuration (here to service module 508 which uses USB signaling). In some embodiments, however, authenticator 116 switches to a third configuration for data lines 210 and/or 212 rather than back to service module 508 (not shown).

Authenticator 116 may also configure ways in which host device 102 may act and interact with peripheral 106. Consider a case where host device 102 is a smartphone physically connected through micro USB cord 202 to battery charger 106-3. In such a case, authenticator 116 configures the data lines to accept whatever charging services are available from battery charger 106-3.

Authenticator 116 can also configure host device 102 to automatically launch software applications in response to determining that peripheral 106 is authentic. Examples include: a user interface for an authenticated battery charger 106-3 showing a battery icon and time needed to complete the charging process; a mapping application for an authenticated car docking station; a telephony application for an authenticated mono (non-stereo) speaker or headset peripheral (e.g., wireless headset 106-1); a file management application for an authenticated smart flash drive 106-2; an audio media-playing application for an authenticated docking station 106-4 (having speakers); removal of a touch screen user interface for typing onto a touch screen of host device 102, such as when host device 102 is a tablet computer and for an authenticated keyboard 106-5 peripheral; and a printer user interface and printer driver applications for an authenticated multi-function printer 106-6. These are but a few of the many ways authenticator 116 can configure host device 102 in response to determining that peripheral 106 is authentic.

At block 314, the host reconfigures the authentication-configured data lines to limited or no use. Authenticator 116 may block the data lines from use, thereby halting communication with peripheral 106, such as when a peripheral is not authenticated. In some cases, however, authenticator 116 configures the data lines to limited use, though this depends on the type of peripheral 106 and whether control of the peripheral is maintained by the host device or the peripheral.

For example, authenticator 116 may establish these data lines to active components of peripheral 106 (here components capable of providing a charge) even when the peripheral is not authentic, but will limit services of peripheral 106 or of host device 102. In such a case, authenticator 116 may forgo automatically launching an application or refuse some services of peripheral 106. Assume, for example, that battery charger 106-3 is not authenticated. Assume also that host device 102 controls the charge coming from battery charger 106-3. Authenticator 116 disconnects the authentication-configured data lines from authentication procedures and establishes these data lines to active components of battery charger 106-3, where host device 102 then limits the services of battery charger 106-3 to a trickle charge and disallows fast charging. Host device 102 may also limit the total charge to a particular amount, such as a charge sufficient to make an emergency call.

Figure 4:
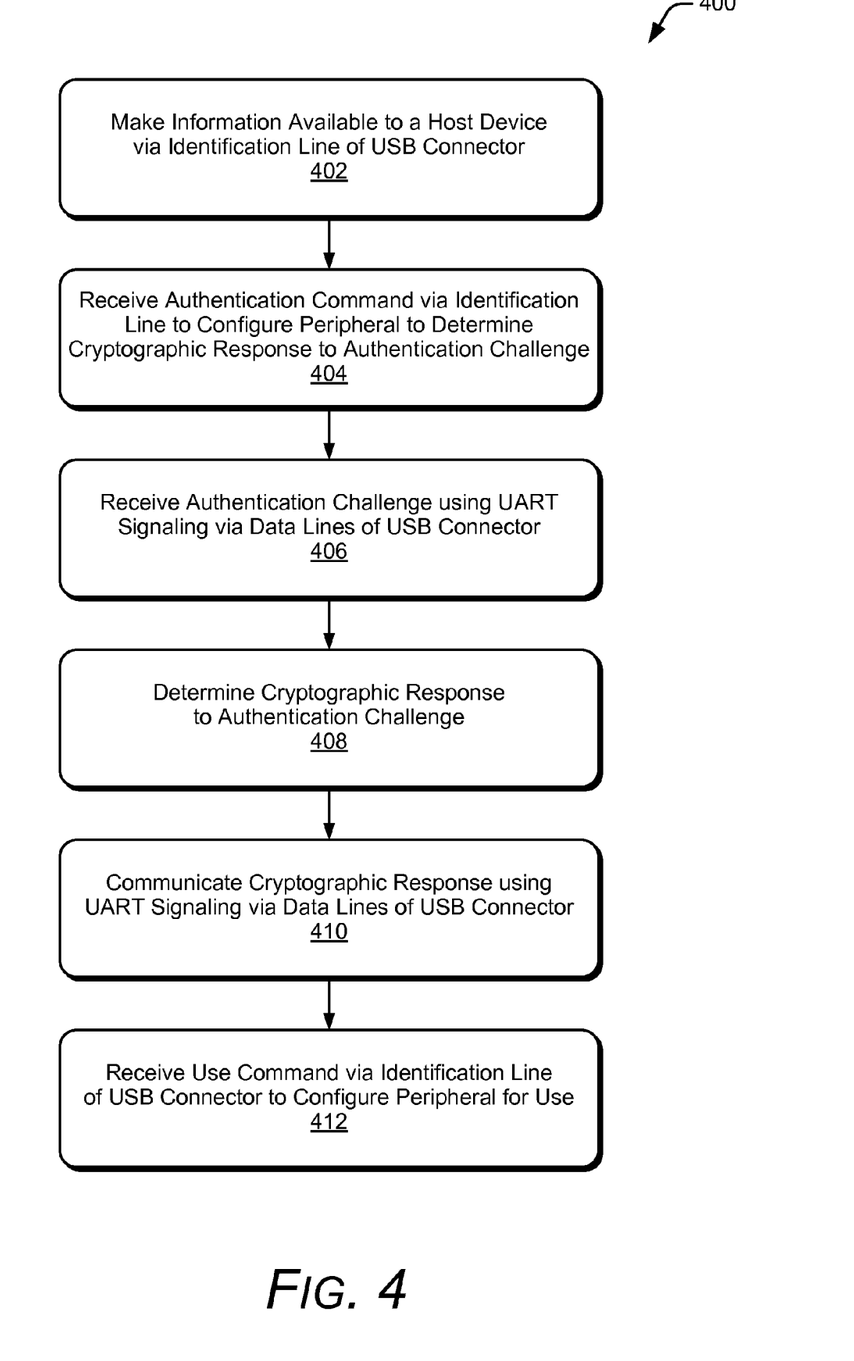
FIG. 4 illustrates example method(s) for peripheral authentication performed at least in part by a peripheral to a host device.

FIG. 4 illustrates example method(s) 400 for peripheral authentication performed at least in part by a peripheral to a host device. The order in which the method blocks are described are not intended to be construed as a limitation, and any number or combination of the described method blocks can be combined in any order to implement a method, or an alternate method.

At block 402, information is made available to a host device via an identification line of a universal serial bus connector, the information indicating that a peripheral to the host device is capable of authentication. As noted from the host device's perspective in FIG. 3, this information can include an identifier or type of peripheral 106, as well as a simple indication of potential authenticity, such as peripheral 106 indicating (including passively) that it includes authentication module 126. When the information is a type of peripheral or a simple indication of potential authenticity, authentication module 126 may make this information available by setting or increasing resistance on identification line 208 of FIG. 2. This identifier or type of peripheral 106, however, may also be provided later in the process through data lines 210 or 212, such as through authentication-configured data line(s) following block 404.

At block 404, the peripheral receives an authentication command from the host device via the identification line, the authentication command effective to configure the peripheral to determine a cryptographic response to an authentication challenge. This authentication command can provide instructions or cause changes to peripheral 106, such as through a voltage level placed on ID line 208. Two examples are described immediately below in FIGS. 5 and 6.

FIG. 5 illustrates examples of host device 102 and peripheral 106 in communication through a universal serial bus connector having five lines (GND line not shown). Peripheral 106 has a configuration switch 502, identification-line resistance 504, voltage comparator 506, at least one service module 508 through which peripheral services are provided, accessed, or controlled, and authentication module 126. Configuration switch 502 is configured to switch between an authentication mode of peripheral 106 and a use mode of peripheral 106, in this example by switching data lines 210 and 212 responsive to a voltage on identification line 208.

For the ongoing example, host device 102 creates a voltage on identification line 208 effective to overcome identification-line resistance 504, which causes voltage comparator 506 to switch (using switch 502) data lines 210 and 212 connections from service module 508 to authentication module 126. FIG. 5 also shows VBUS line 214, from which authentication module 126 can receive power sufficient to respond to an authentication challenge. VBUS line 214 provides power in cases where peripheral 106 does not have a power source or is currently without sufficient power to operate authentication module 126. By so doing, the authentication command completes the circuit thereby permitting authentication module 126 to respond to an authentication challenge.

Figure 6:
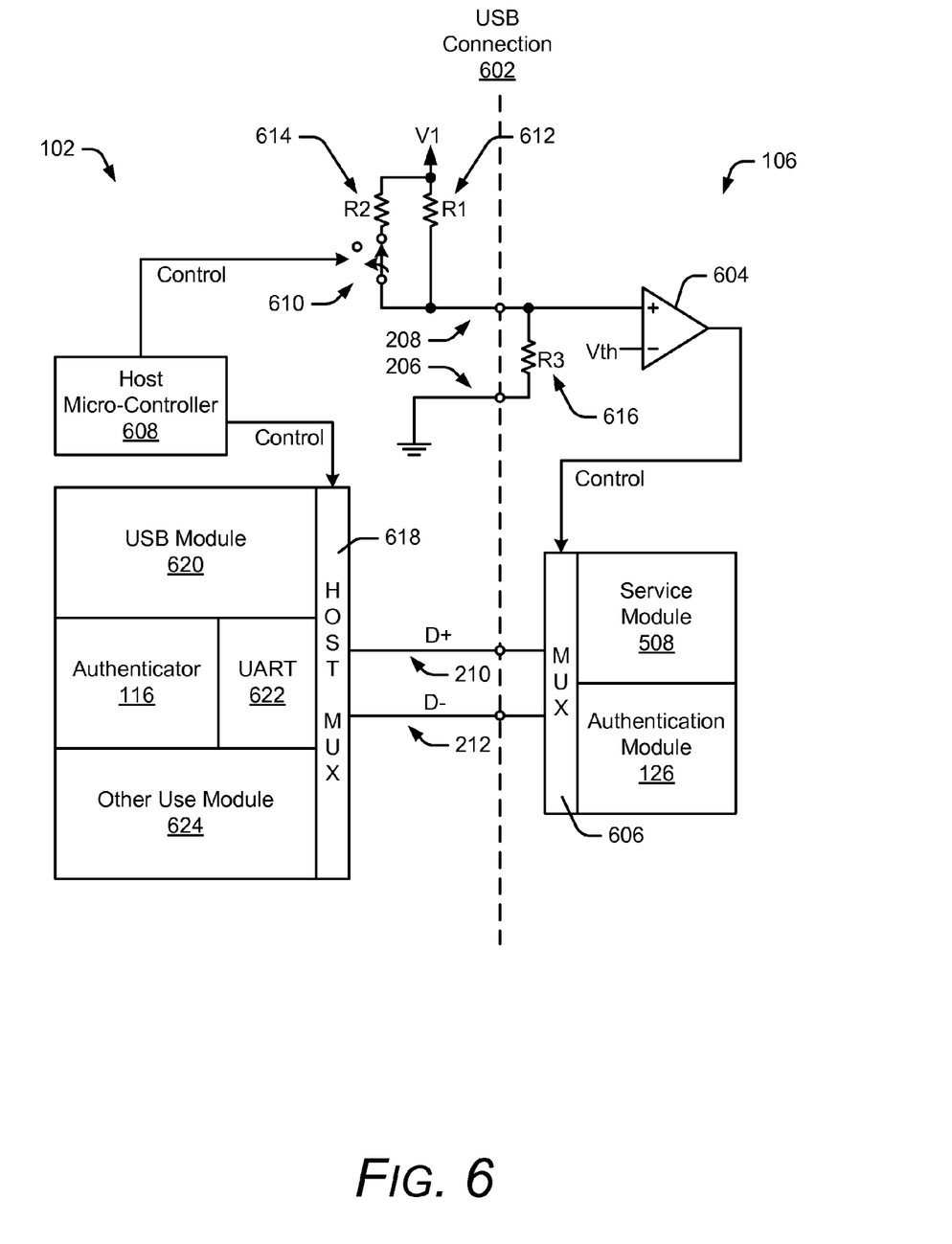
FIG. 6 illustrates examples of entities of FIG. 1 in communication through a universal serial bus cord.

FIG. 6 illustrates examples of host device 102 and peripheral 106, here shown communicating through USB connection 602. Peripheral 106 has an op-amp comparator 604 capable of controlling (based on a voltage set by host 102) a multiplexer 606 effective to configure data lines 210, 212 to either service module 508 or authentication module 126. As shown, in these examples host micro-controller 608 controls the actions of op-amp comparator 604 through ID line 208 through various resistances and using a host switch 610. This host switch 610 controls op-amp comparator 604 by adjusting pull-up resistance in host 102, first resistance R1 shown at 612 and second resistance R2 shown at 614, on ID line 208, which is affected by resistor R3 shown at 616 in peripheral 106 (through which ID line 208 is connected to ground through ground line 206).

Note in this case that host device 102 uses host micro-controller 608 to also control use of data lines 210, 212 through host multiplexer 618 effective to use elements of host 102, namely USB module 620, authenticator 116, universal asynchronous receiver/transmitter (UART) module 622, and/or other use module 624. In these examples of host 102 and peripheral 106, host micro-controller 608 performs some of the actions attributed to authenticator 116 noted above. After host micro-controller 608 connects UART module 622 to data lines 210, 212 through host multiplexer 618, however, authenticator 116 performs, through serial communications over UART module 622, an authentication protocol. If authenticator 116 determines that the peripheral is authentic, host micro-controller 608 switches data lines 210, 212 from authentication to services. In such a case, host micro-controller 608 connects USB module 620 or other use module 624, through host multiplexer 618 to service module 508 through multiplexer 606. By so doing, host 102 may use services of peripheral 106.

Returning to FIG. 4, at block 406, the peripheral receives the authentication challenge from the host device via data lines of the USB cord. As noted above, the authentication challenge can be received from authenticator 116 of host device 102 over authentication-configured data lines 210 and 212.

In some cases, the peripheral makes an identifier available to the host through the authentication-configured data lines after block 404 but prior to block 406. In such a case, the authentication challenge and response may be based on this identifier. For this example, assume that the authentication challenge is a large random number that may or may not be based on a provided identifier.

At block 408, a cryptographic response to the authentication challenge is determined. While other manners of authentication can be used, in this example authentication module 126 of peripheral 106 computes, based on the large random number received at block 406, a response using a secret key.

At block 410, the cryptographic response is communicated to the host device using UART signaling via the data lines of the USB connector. As noted above, authenticator 116 of host device 102 can receive the cryptographic response, compare it with an expected response, and if they match, authenticate peripheral 106.

In an alternative embodiment, the authentication challenge and response include a request for an identifier securely stored in peripheral 106 (e.g., in authentication module 126) and a response having this identifier, respectively. The determination at block 408, in this example, may simply find this identifier in a look-up table or other data structure and, at block 410, communicate this identifier via the authentication-configured data lines. Authenticator 116 of host device 102 may receive this identifier, compare it to one or more authentic identifiers expected for peripheral 106, and if a match is found, authenticate peripheral 106.

At block 412, a use command is received from the host device via the identification line of the USB cord, the use command effective to configure the peripheral for use. This use command, when received from host device 102 by peripheral 106, affects services provided by and functions of peripheral 106. As noted above, however, host device 102 may also or instead provide or limit various applications and services of host device 102 based on the authenticity of peripheral 106.

Consider a case where peripheral 106 is smart flash-drive 106-2, which is authenticated by host device 102. In such a case, the use command causes the authentication-configured data lines to be disconnected from authentication module 126 and coupled to service module 508 to send and receive data to and from flash memory. In an alternate case, where smart flash-drive 106-2 is not authenticated, peripheral 106 may not receive this use command but instead have data lines blocked for USB data input to host device 102 but allowed for USB data output from host device 102 effective to permit write-only capabilities to the smart flash-drive 106-2. If the data lines are switched over to use for services when peripheral 106 is not authenticated, host device 102 may limit functions of peripheral 106 (though not directly by blocking the data lines). In other cases, the host device 102 may completely block data communication both to and from the peripheral 106. As noted above, authenticator 116 may limit functions and services of host device 102 whether or not authenticator 116 limits peripheral 106.

Although two modes are described in many examples above, other modes are also contemplated. For example, comparator 506 of FIG. 5 may have two outputs, thereby enabling three modes, such as an analog audio mode in addition to the USB data and authentication modes mentioned above.

Example Peripheral

Figure 7:
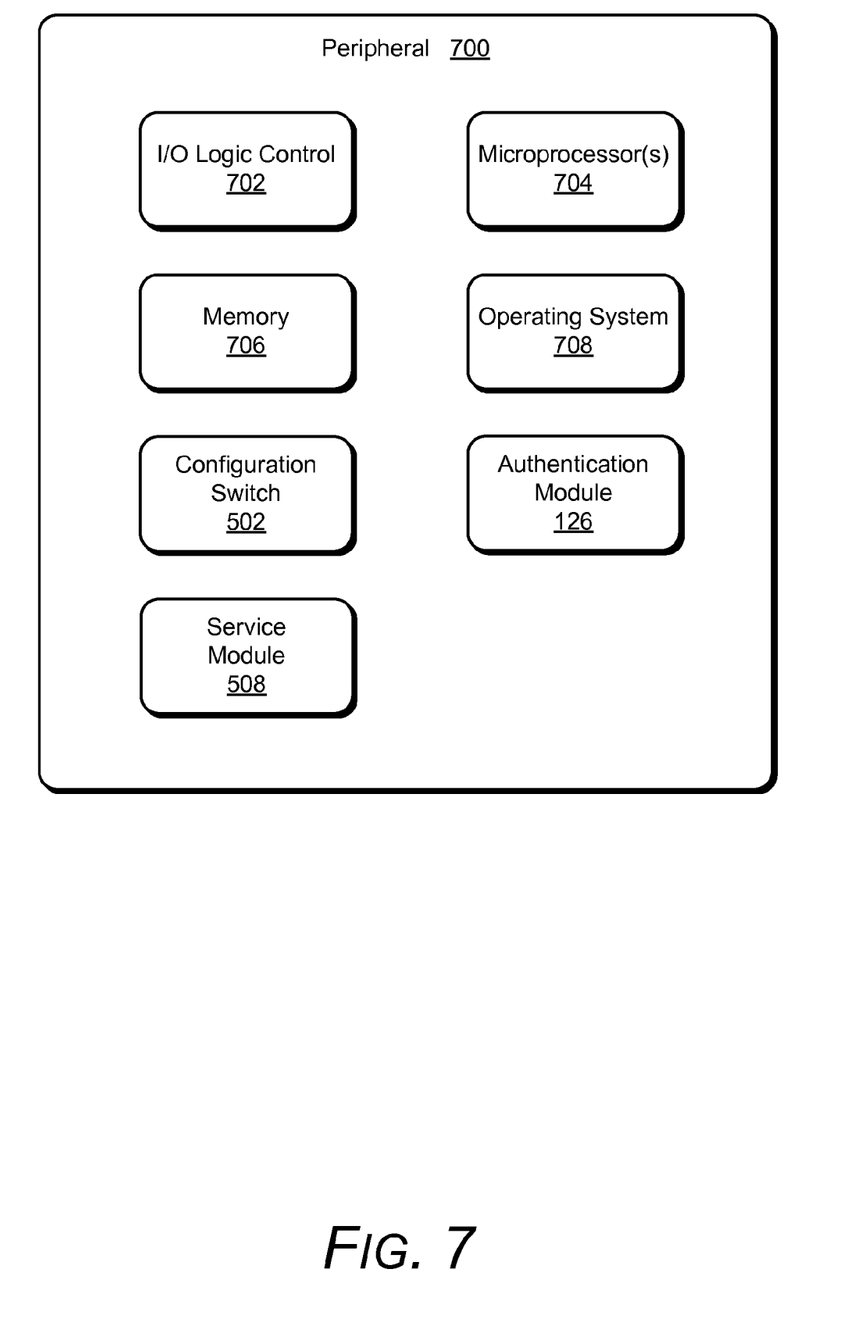
FIG. 7 illustrates various components of an example peripheral that can implement techniques for peripheral authentication.

FIG. 7 illustrates various components of an example peripheral 700, which is implemented in hardware, firmware, and/or software, or as described with reference to any of the previous FIGS. 1-6 to implement peripheral authentication.

Example peripheral 700 can be implemented in a fixed or mobile device being one or a combination of a media device, computer device, television set-top box, video processing and/or rendering device, appliance device (e.g., a closed-and-sealed computing resource, such as some digital video recorders or global-positioning-satellite devices), gaming device, electronic device, vehicle, workstation, WLAN peer device/client station, and/or in any other type of device that may communicate through a wired or wireless communication medium to a host device. Examples of some of these are shown in FIG. 1 at 106.

Example peripheral 700 can be integrated with electronic circuitry, a microprocessor, memory, input-output (I/O) logic control, communication interfaces and components, other hardware, firmware, and/or software needed to run an entire device. Example peripheral 700 can also include an integrated data bus (not shown) that couples the various components of the peripheral for data communication between the components.

Example peripheral 700 includes various components such as an input-output (I/O) logic control 702 (e.g., to include electronic circuitry) and a microprocessor 704 (e.g., any of a microcontroller or digital signal processor). Example peripheral 700 also includes a memory 706, which can be any type of random access memory (RAM), a low-latency nonvolatile memory (e.g., flash memory), read only memory (ROM), and/or other suitable electronic data storage. Example peripheral 700 can also include various firmware and/or software, such as an operating system 708, which can be computer-executable instructions maintained by memory 706 and executed by microprocessor 704. Example peripheral 700 can also include other various communication interfaces and components, wireless LAN (WLAN) or wireless PAN (WPAN) components, other hardware, firmware, and/or software.

Example peripheral 700 includes configuration switch 502, service module 508, and authentication module 126. Examples of these components and their functions are described with reference to the respective components as shown in FIGS. 1, 5, and/or 6.

Authentication module 126 in example peripheral 700, either independently or in combination with other entities, can be implemented as computer-executable instructions maintained by memory 706 and executed by microprocessor 704 to implement various embodiments and/or features described herein. Authentication module 126 may also be provided integral with other entities of the peripheral, such as integrated with configuration switch 502. Alternatively or additionally, authentication module 126 and the other components can be implemented as hardware, firmware, fixed logic circuitry, or any combination thereof that is implemented in connection with the I/O logic control 702 and/or other signal processing and control circuits of example peripheral 700.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
    determining, based on information read or received from a peripheral in communication with a host device, that the peripheral is capable of authentication;
    configuring data lines for non-differential signaling;
    performing an authentication protocol using the non-differential signaling data lines effective to authenticate the peripheral; and
    responsive to the peripheral being authenticated, re-configuring the non-differential signaling, data lines back to differential signaling for full use, or
    responsive to the peripheral not being authenticated, configuring the non-differential signaling, data lines for limited use or no use.

2. The method as recited in claim 1, wherein, prior to configuring the data lines to perform the authentication protocol, the data lines are configured for differential signaling.

3. The method as recited in claim 2, wherein the non-differential signaling is part of a UART protocol and the differential signaling is part of a USB protocol.

4. The method as recited in claim 1, wherein the information is read from the peripheral via an identification line of a universal serial bus connector having five or more lines.

5. The method as recited in claim 4, further comprising:
    determining that the identification line has a resistance consistent with the peripheral being capable of authentication, the information utilized to determine that the peripheral is capable of authentication being a resistance value on the identification line.

6. The method as recited in claim 4, further comprising configuring a power line of the five or more lines, the configuring effective to receive power from, or transmit power to, the peripheral.

7. The method as recited in claim 1, wherein configuring the data lines to perform the authentication protocol includes configuring the host device to perform a one-wire authentication protocol using the non-differential signaling data lines.

8. The method as recited in claim 1, wherein the information is read from the peripheral and identifies a type of the peripheral and the type indicates that the peripheral is capable of authentication.

9. The method as recited in claim 1, wherein a type of the peripheral is read or received from the peripheral through the non-differential signaling data lines, the type affecting the authentication protocol or the full or limited use.

10. The method as recited in claim 1, further comprising:
    responsive to the peripheral lines being authenticated, launching a software application.

11. The method as recited in claim 1, wherein performing the authentication protocol includes:
    requesting an identifier from the peripheral;
    receiving the identifier from the peripheral;
    determining whether the identifier matches one of a set of authentic identifiers; and
    challenging the peripheral through the non-differential signaling data lines responsive to the identifier matching one of the set of authentic identifiers.

12. A method, comprising:
    making information available to a host device via an identification line of a universal serial bus (USB) connector, the information indicating that a peripheral to the host device is capable of authentication;
    receiving an authentication command from the host device via the identification line, the authentication command effective to configure the peripheral to determine a cryptographic response to an authentication challenge;
    receiving the authentication challenge from the host device via data lines of the USB connector, wherein the data lines are configured for non-differential signaling;
    communicating the cryptographic response to the host device via the data lines of the USB connector; and
    receiving a use command from the host device via the identification line of the USB connector, the use command effective to re-configure the data lines for differential signaling.

13. The method as recited in claim 12,
    wherein, prior to receiving the authentication challenge from the host device via data lines of the USB connector, the data lines are configured for a universal serial bus (USB) protocol;
    wherein, during receiving the authentication challenge from the host device via data lines of the USB connector and communicating the cryptographic response to the host device via the data lines of the USB connector, the data lines are configured for a universal asynchronous receiver/transmitter (UART) protocol; and
    wherein, after receiving the use command from the host device via the identification line of the USB connector, reconfiguring the data lines for the USB protocol.

14. The method as recited in claim 12, wherein making information available to the host device comprises:
    increasing a resistance on the identification line.

15. The method as recited in claim 12, wherein the information identifies a class of peripheral.

16. The method as recited in claim 12, wherein the authentication command closes a switch in the peripheral to complete a circuit that includes the data lines of the USB connector and an authentication module of the peripheral, the authentication module for determining the cryptographic response to the authentication challenge.

17. The method as recited in claim 16,
    wherein the authentication command is further effective to disconnect the data lines from a service module, and wherein the use command disconnects the data lines from the authentication module and connects the data lines to the service module.

18. A peripheral to a host device, the peripheral comprising:
    a configuration switch configured to switch one or more data lines of a universal serial bus (USB) connector responsive to a command received via an identification line of the USB connector, the one or more data lines configured to switch between an authentication module of the peripheral using non-differential signaling and a service module of the peripheral using differential signaling,
    wherein the authentication module is configured to determine a cryptographic response to a challenge received from the host device via the one or more data lines, the cryptographic response usable to authenticate the peripheral.

19. The peripheral as recited in claim 18, further comprising:
    a five-pin USB port communicatively coupled to the identification line, two data lines of the one or more data lines, a power line, and a ground line.

20. The peripheral as recited in claim 18, further comprising:
    a resistance element coupled to the identification line, the resistance element configured to be determinable as a resistance on the identification line.

* * * * *